CORRELATION SYSTEM
Filed Dec. 28, 1959 3 Sheets-Sheet 1
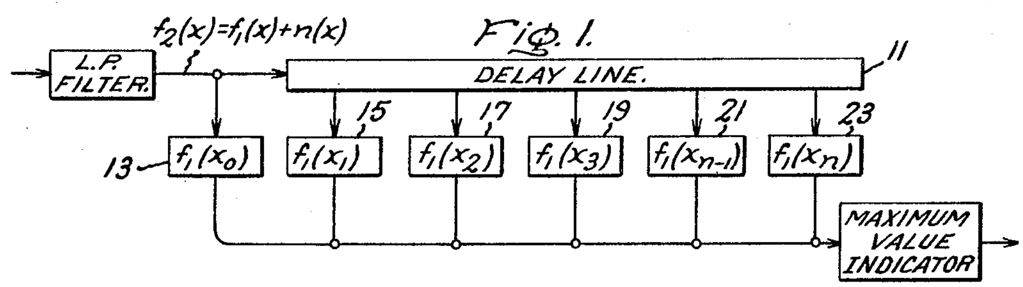
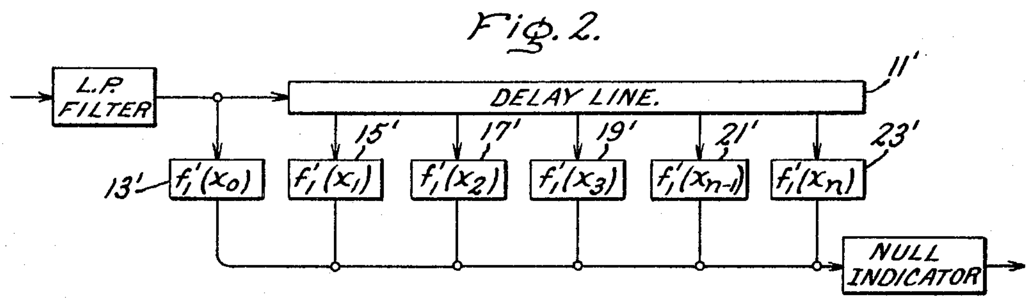
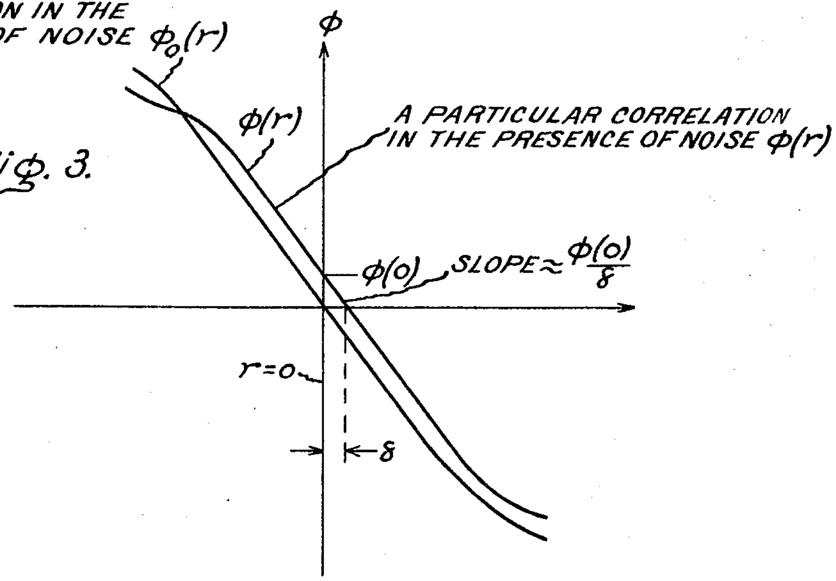
Inventor:
Manuel Ares,
by Allen E. Amgott
His Attorney.

Fig. 4.

| WEIGHTING FUNCTION $h(x)$ | $R=\frac{\int_{-x_0}^{x_0} h^2(x)dx}{\left[\int_{-x_0}^{x_0} h(x)f_1'(x)dx\right]^2}$ | $R$ FOR $kx_0=\frac{\pi}{2}$ |
|---|---|---|
| OPTIMUM $h(x)=-\sin kx$ 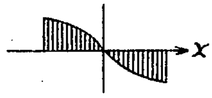 | $\frac{1}{kx_0-\sin kx_0 \cos kx_0}$ | 0.637 |
| LINEAR $h(x)=-x$ 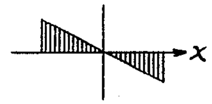 | $\frac{(x_0k)^3}{6\left[\sin kx_0-kx_0\cos kx_0\right]^2}$ | 0.645 |
| STEP $h(x)=\begin{bmatrix}1; x<0\\-1; x>0\end{bmatrix}$ 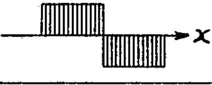 | $\frac{x_0k}{2\left[\cos kx_0-1\right]^2}$ | 0.785 |
| SPLIT COSINE $h(x=\begin{bmatrix}\cos kx; x<0\\-\cos kx; x>0\end{bmatrix}$ 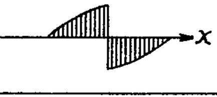 | $\frac{kx_0+\sin kx_0\cos kx_0}{\sin^4 kx_0}$ | 1.57 |

Inventor:
Manuel Ares,
by Allen E. Amgott
His Attorney.

CORRELATION SYSTEM
Filed Dec. 28, 1959
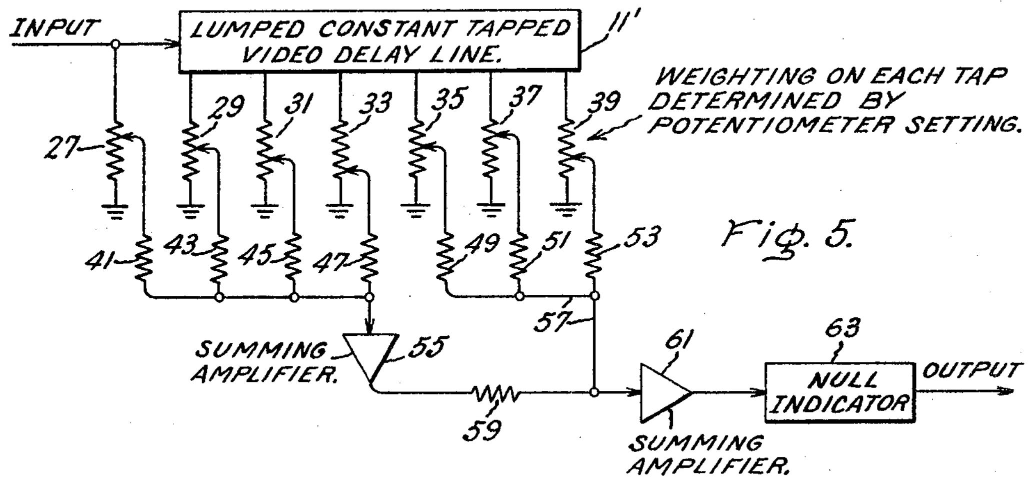
Fig. 5.
Fig. 6.
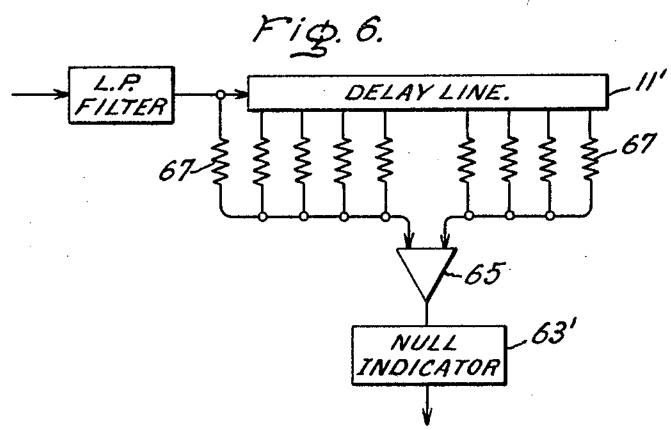
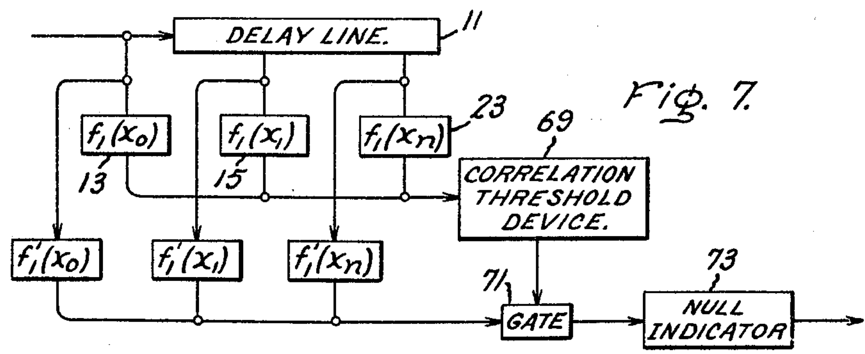
Fig. 7.
Inventor:
Manuel Ares,
by Allen E. Angott
His Attorney.

United States Patent Office 3,270,188 Patented August 30, 1966

3,270,188

CORRELATION SYSTEM

Manuel Ares, Ithaca, N.Y., assignor to General Electric Company, a corporation of New York Filed Dec. 28, 1959, Ser. No. 862,414
7 Claims. (Cl. 235—181)

The present invention relates to correlation processes and more particularly to a correlation system in which there is produced an output signal which traverses zero when the input signal is matched to a known reference function.

Correlation processes have application to a variety of electronic systems, such as, detection, communications, and image recognition systems wherein one attempts to compare known information with information that is being acquired. For example, the need for comparing two waveforms efficiently occurs frequently in electronic systems. The objectives of this comparison is usually to obtain a quantitative measure of the "degree of similarity" between the waveforms. When one of the waveforms consists of the sum of a weak delayed replica (echo) of the other waveform and a wholly unrelated interfering waveform (noise), this measure can be used to detect the presence of the replica. One of the very efficient methods for comparing waveforms is the correlation process.

Correlation systems utilizing correlation processes have been designed to solve the problem of deciding either the most likely time at which an event occurs or which of a set of symbols or characters is most likely the one being examined. In these systems correlation is achieved by comparing an incoming message or signal with a stored reference at various times, or comparing the electrical representative of a character or a symbol being examined with all of the symbols which a correlation device is capable of recognizing. After the completion of the comparison, the system must be capable of selecting the time at which the highest correlation occurs (for the character recognition type system, there is an equivalent decision that must first be made). This selection step requires the use of additional logic circuit, sometimes referred to as a "greatest of all selector."

The present invention simplifies the decision making process required in the prior correlation systems by providing a signal which may be used, such as, to position a servomechanism in various types of matching systems. In one embodiment, applicant provides a method wherein by proper choice of the weighting functions of a delay line type of correlator, the output of the device will indicate a null when the input of the device is matched to a stored or known function.

Accordingly, one object of the present invention is to provide a correlation system for comparing a stored waveform with a noise degraded replica to produce an output signal at maximum correlation.

Another object of the present invention is to provide a correlation system in which an output signal is a null when the correlation between the incoming waveform and a stored waveform is maximum.

A further object of the invention is to provide in a correlation system, an output signal that is suitable for driving a servo positioning mechanism so that maximum correlation may be achieved in a map matching or character type correlation system.

Other objects and many of the attendant advantages of this invention may be readily appreciated as the same becomes better understood by reference to the following detailed description when considered in conjunction with the accompanying drawings wherein:

FIGURE 1 illustrates an embodiment in block diagram form of a delay line correlator system;

FIGURE 2 indicates one embodiment in block diagram form of a null indicating correlator;

FIGURE 3 is a graphical plot illustrating the effect of noise on the correlator output of FIGURE 2;

FIGURE 4 is a chart illustrating the relative performance on different weighting functions;

FIGURE 5 is a schematic drawing of one embodiment of the invention shown in FIGURE 2;

FIGURE 6 illustrates an embodiment in block diagram form of a radar beam splitter type correlator; and FIGURE 7 illustrates in block diagram form a correlator which ignores ambiguities.

In brief, applicant's invention comprises a correlating device for comparing a waveform which is stored with a replica of the stored waveform, which may be noise degraded, to produce an output signal which is a null when the correlation is at a maximum. The stored waveform is represented in terms of samples of its derivative. A tapped delay device, which may in practice be realized by a lumped parameter video delay line, a tapped magnetostrictive delay line, a magnetic drum or magnetic tape with multiple readout heads, or an arrangement of shift registers, can be utilized to provide a set of voltages which represent the input signal to the device. Each of these voltages appear simultaneously at the various taps. The voltages are weighted that is, multiplied by a constant, by an amount proportional to the derivative of the stored function and the sum of the weighted voltages is obtained. The resulting sum voltage has the desirable property of traversing zero at a time corresponding to a maximum correlation. Thus, the output voltage from the correlator has the useful property of changing sign when the maximum correlation point is reached. Therefore, the resultant signal has a "sense" and may be utilized for operation of a servo in a map matching or image recognition type system.

In order for the invention to be more fully appreciated, the following mathematical analysis is presented in connection with a problem for the determination of accurate azimuth angle from the output of the receiver of a scanning radar. In particular, the discussion will be limited to an antenna that rotates at a constant angular velocity scanning past a stationary radar beacon whose azimuth angle is to be determined from a single scan. The method for solving this problem shall be that of choosing a simple mathematical model and obtaining an expression for the minimum "mean square error."

As the antenna scans the target upon which is mounted a beacon, the beacon reply triggered by the radar transmitted signal will be modulated by the antenna one-way pattern to produce at the output of the receiver a sequence of pulses whose amplitudes are samples of the antenna pattern. Let the antenna pattern which is known be stored in some suitable manner and be denoted as $f_1(x)$. The signal output of the receiver after low-pass filtering for a target at an angle $\theta_B$ will be $$e_0=f_2(t-t_B)=f_1(t-t_B)+n(t) \quad (1)$$

where $(t-t_B)=(x)$, $t_B$=time at which the peak or reference point of the antenna pattern was at angle $\theta_B$ and $t$=an arbitrary time for the case of a linear envelope detector under high signal-to-noise (S/N) conditions, or a synchronous detector under any signal-to-noise conditions. In Equation 1, $n(t)$ is the noise fluctuation in the output.

If the stored function $f_1(x)$ is compared with (scanned over) $f_2(t-t_B)$ and the time at which the two functions are matched is observed, angle $\theta_B$ will be known. It is reasonable to expect that the best estimate of $\theta_B$ is obtained when the mean square error between $f_1$ and $f_2$ is a minimum. This leads to maximizing the value of the correlation between $f_1$ and $f_2$; that is, if the error between $f_1$ and $f_2$ is $$\epsilon = f_1(x) - f_2(x-\tau) \quad (2)$$

where $\tau$ is a variable and it is desired to minimize the average mean square error ($\epsilon$)

$$\epsilon = E[\epsilon^2] = E[(f_1(x) - f_2(x-\tau)^2] \quad (3)$$

where $E[\ ]$ denotes the expected value or average $$= E[f_1(x)^2]E[f_2(x)^2] - 2E[f_1(x)f_2(x-\tau)]$$

then the cross-correlation function $$\Phi(\tau) = E[f_1(x)f_2(x-\tau)] = \lim_{T\to\infty} \frac{1}{2T}\int_{-T}^{T} f_1(x)f_2(x-\tau)\,dx \quad (4)$$

must be maximized.

One method of performing a correlation between $f_1(x)$ and $f_2(x-\tau)$ (which approximates the cross-correlation process as defined by Equation 4) is illustrated in FIGURE 1. In FIGURE 1 there is shown a delay line correlator which includes a delay line 11, such as a magnetic drum, magnetic tape or magnetostrictive delay line, and a plurality of read-out lines (taps) suitably connected to the delay line. These read-out lines are weighted taps as indicated at 13 to 23 which perform the multiplication required by Equation 4. This multiplication operation is conveniently performed by potentiometers such as those illustrated in FIGURE 5 at 27, 29, 31, etc. and described below which are adjusted to appropriate values of $f_1(x)$. Tap 13 is actually weighed for zero delay. It will be recognized by those skilled in the art that the greater the number of taps, the greater will be the accuracy of the correlator. Also, the number of taps is a function of the bandwidth of the signal being processed. The taps are spaced along the delay line so that the time spacing in time delay is equal to the reciprocal of the bandwidth of the signal that is being correlated.

The particular type of tap is dependent upon the particular delay line utilized. For example, if the delay line is in the form of a magnetic drum rotating at constant speed, the signal (waveform) to be processed is introduced on the drum by means of a record head. Because the drum is rotating at constant speed, there would be introduced on the periphery of the drum the desired time delay. Thus, pickup heads placed at equal angular steps or positions on the drum would represent equal increments of time delay, the pickup heads representing the taps.

In a magnetostrictive delay line, there is a wire delay line into which a signal is introduced. The signal travels at the speed of sound in the wire. The taps would be in the form of tiny magnetostrictive pick ups. By means of amplifiers connected to the pickups, proper selection of the required weighting factors can be made.

Another type of delay line that may be employed is that of a lumped, constant type delay line in which the delay is obtained by a plurality of cascaded inductive-capacitive (L-C) filter networks to which weighted taps are connected at appropriate points along the line. The delay line must be properly terminated to eliminate reflections in the line. Also by properly matching the taps to the line, no reflections will occur.

Returning now to the mathematical analysis of the correlator, the incoming waveform signal is in the form $f_2(x) = f_1(x) + n(x)$. The outputs of the tapped delay line are provided with weighting factors so that the sum of the voltages at all the taps may be expressed as:

$$F(\tau) = \sum_{i=1}^{i=N} f_2(x_i - \tau) f(x_i) \quad (5)$$

where $\tau$ is a time variable. If $f_2(x)$ is filtered so that it is band-limited to a band B and the number of taps per unit of delay is consistent with this bandwidth (as determined by Shannon's Sampling Theorem), an equivalent integral expression for Equation 5 is $$F(\tau) = f_r \int_{-x_0}^{x_0} f_1(x)f_2(x-\tau)\,dx \quad (6)$$

By means of a change in variable the alternative form of Equation 6 is $$F(\tau) = f_r \int_{-x_0+\tau}^{x_0-\tau} f_1(x+\tau)f_2(x)\,dx \quad (7)$$

where $f_r$ in Equations 6 and 7 is the pulse repetition rate of the radar, and $2x_0$ is the total delay of the line. Several comments about function $F(\tau)$ are now in order. Consider the noise-free case in which $f_1(x) = f_2(x)$;

$$F_0(\tau) = f_r \int_{-x_0}^{x_0} f_1(x)f_1(x-\tau)\,dx \quad (8)$$

Unlike, the auto-correlation functions, $F_0(\tau)$ does not in general have its maximum value at $\tau = 0$. This may be seen by differentiating Equation 8 with respect to $\tau$.

$$F_0'(\tau) = f_r \int_{-x_0}^{x_0} f_1(x)f_1'(x-\tau)\,dx \quad (9)$$

where the prime denotes differentiation with respect to $\tau$. If $F_0(\tau)$ has a maximum value at $\tau=0$, $F_0'(\tau)$ must be zero for $\tau=0$; hence, $$F_0'(0) = f_r \int_{-x_0}^{x_0} f_1(x)f_1'(x)\,dx = 0 \quad (9')$$

Similarly, differentiating Equation 7 for the noise-free case gives $$F_0'(\tau) = f_r\left[\int_{-x_0-\tau}^{x_0-\tau} f_1'(x-\tau)f_1(x)\,dx - f_1(x_0)f_1(x_0-\tau) + f_1(-x_0)f_1(-x_0-\tau)\right] \quad (10)$$

which for $\tau=0$ is $$F_0'(0) = f_r\left[\int_{-x_0}^{x_0} f_1'(x)f(x)\,dx - f_1^2(x_0) + f_1^2(-x_0)\right] \quad (11)$$

Making use of Equation 9 gives $$f_1^2(x_0) = f_1^2(-x_0) \quad (12)$$

This is the condition under which $F_0(\tau)$ is maximum (or minimum) for $\tau=0$. The condition is satisfied if $f_1(\tau)$ has either even (as are most antenna patterns) or odd symmetry. It may be further deduced from the above that a symmetric in the antenna pattern will be a measurable source of error. Although, under the restrictions placed above, the delay line correlator of FIGURE 1 approaches the optimum signal processing in that it approximates the mathematical operation described in Equation 4, it suffers from the disadvantage that the time at which the maximum value of the output occurs must be determined. This is difficult to accomplish in terms of equipment design. It would be desirable instead to have a correlating device whose output would cross zero at the time of interest. By performing a change in variable, from Equation 9 it may be seen that function $$\phi(\tau) = f_r \int_{-x_0-\tau}^{x_0-\tau} f_1'(x+\tau)f_2(x)\,dx$$

possesses the desired property (in the absence of noise). It therefore seems desirable to correlate the signal with the derivative of the antenna pattern by using a device such as that shown in FIGURE 2.

In FIGURE 2 there is shown in block diagram form one embodiment of the invention. As shown in FIGURE 2 there is included a delay line 11' such as shown in FIGURE 1 which may be in the form of a quartz line, lumped constant line, delay-line memory, or delay-line register. A plurality of taps 13' to 23' are suitably connected to the delay line and are weighted by factors proportional to the derivative of the waveform to be recognized and not the waveform itself as in the correlator of FIGURE 1.

The mean square error incurred in the null correlator of FIGURE 2 will be determined, subject to the following assumptions:

(1) The antenna pattern, $f(x)$, is symmetrical (an even function) about its boresight.

(2) Conditions of high signal-to-noise ratio prevail.

For reasons that will become apparent, let $$h(x)=f_1'(x)$$

Also, recall that $$f_2(x)=f_1(x)+n(x)$$

The output of the null correlator in the absence of noise ($n(x)=0$) is, by use of the argument following Equation 5, $$\phi_0(\tau)=f_r\int_{-x-\tau}^{x-\tau} h(x+\tau)f_1(x)\,dx \quad (13)$$

which is zero for $\tau=0$. In the presence of noise $\phi(0)$ will not in general be zero; rather $$\phi(0)=f_r\int_{-(x+\tau)}^{x-\tau} h(x+\tau)[f_1(x)+n(x)]dx\Big|_{\tau=0} \quad (14)$$

$$=f_r\int_{-x_0}^{x_0} h(x)n(x)\,dx \quad (15)$$

The funtion $\phi(\tau)$ will, however, be zero in the vicinity of $\tau=0$, say at a value of $\tau=\delta$. As a result, the time at which the antenna boresight scanned the target will be in error by an amount $\delta$. An expression for this error may be obtained with the aid of FIGURE 3. Since the high signal-to-noise ratio case is being considered, the error $\delta$ will be small and both $\phi_0(\tau)$ and $\phi(\tau)$ may be considered to be linear in the region of interest, so that the region of interst, so that $$\delta=\frac{\phi(\tau)}{\frac{\partial\phi(\tau)}{\partial\tau}}\Bigg]_{\tau=0}=\frac{\phi(0)}{\phi'(0)} \quad (16)$$

Another consequence of high S/N is that the $\phi'(0)$ (the slope of the curves shown in FIGURE 3) is to a very good approximation equal to $\phi'_0(0)$. This may be seen by considering $$\phi'(\tau)=\frac{d}{d\tau}f_r\int_{-x-\tau}^{x-\tau} h(x+\tau)[f_1(x)+n(x)]dx \quad (17)$$

Since $f_1(x)$ is much greater in magnitude than the noise function $n(x)$ the latter may be neglected with respect to the former, as long as $\phi_0'(\tau)$ is not nearly zero in the region of interest (which it is not). Equation 17 may, therefore, be simplified to $$\phi'(\tau)\approx\phi_0'(\tau)=\frac{d}{d\tau}f_r\int_{-(x+\tau)}^{x-\tau} h(x+\tau)f_1(x)\,dx$$

$$=\frac{d}{d\tau}f_r\int_{-x_0}^{x_0} h(x)f_1(x-\tau)\,dx$$

$$=f_r\int_{-x_0}^{x_0} h(x)f_1'(x-\tau)\,dx$$

or $$\phi'(0)=f_r\int_{-x_0}^{x_0} h(x)f_1'(x)\,dx \quad (18)$$

Equation 16 may now be written as $$\delta=\frac{\phi(0)}{\phi'(0)}=\frac{\int_{-x_0}^{x_0} h(x)n(x)\,dx}{\int_{-x_0}^{x_0} h(x)f_1'(x)\,dx}$$

The mean square error is given by $$\overline{\delta^2}=E[\delta^2]=E\frac{\left[\left[\int_{-x_0}^{x_0} h(x)n(x)\,dx\right]^2\right]}{\left[\int_{-x_0}^{x_0} h(x)f_1'(x)\,dx\right]^2} \quad (19)$$

It is now convenient to revert to the summation form of the integral; hence, $$\int_{x_0}^{x_0} h(x)n(x)\,dx\approx\frac{1}{f_r}\sum_{i=1}^{N}h(x_i)n(x_i)$$

where $N$=number of taps to the delay line and $$E\left[\left[\int_{x_0}^{x_0} h(x)n(x)\,dx\right]^2\right]=\frac{1}{f_r^2}\sum_{i=1}^{N}\sum_{j=1}^{N}h(x_i)h(x_j)E[n(x_i)n(x_j)] \quad (20)$$

Since $n(x_1)$ and $n(x_j)$ correspond to independent samples of noise (taken at the pulse repetition frequency) from a distribution that is approximately Gaussian (again, high S/N) with zero mean, $$E[n(x_i)n(x_j)]\begin{bmatrix}\sigma_i^2; & i=j\\ 0; & i\neq j\end{bmatrix} \quad (21)$$

and $\sigma_i^2=\sigma^2$=a variance of $n(x)$

Therefore, Equation 20 becomes $$E\left[\left[\int_{-x_0}^{x_0} h(x)n(x)\,dx\right]^2\right]=\frac{\sigma^2}{f_r^2}\sum_{1}^{N}h^2(x_i)$$

Getting this result back to integral form, $$\sum_{1}^{N}h^2(x_i)=f_r\int_{-x_0}^{x_0} h^2(x)\,dx \quad (22)$$

and the final result is $$\overline{\delta^2}=\frac{\sigma^2}{f_r}\frac{\int_{-x_0}^{x_0} h^2(x)\,dx}{\left[\int_{-x_0}^{x_0} h(x)f_1'(x)\,dx\right]^2} \quad (23)$$

But by definition $h(x)=f_1'(x)$; therefore, $$\overline{\delta^2}=\frac{\sigma^2}{f_r}\frac{1}{\int_{-x_0}^{x_0}[f_1'(x)]^2dx} \quad (24)$$

The expression of Equation 23 is not restricted to uses in which $h(x)=f_1'(x)$; in fact $h(x)$ may be shown to be any reasonable odd function if $f_1(x)$ is an even function. It will now be demonstrated that choosing $h(x)=f_1'(x)$ leads to a minimum value for $\overline{\delta^2}$ for a correlation of the type being analyzed. Consider only functions that have a constant noise output power; that is, $$\frac{\sigma^2}{f_r}\int_{-x_0}^{x^0} h^2(x)\,dx=k_0 \quad (25)$$

Minimizing Equation 23 is now equivalent to maximizing the integral.

$$I=\int_{-x_0}^{x_0} h(x)f_1'(x)\,dx \quad (26)$$

subject to the constraint of Equation 25. It can be shown (see F. B. Hildebrand, "Methods of Applied Mathematics," New York: Prentice-Hall, Inc., 1952, pp. 139–143) that this does indeed lead to the value $h(x)=f_1'(x)$.

To determine how various weighting functions $h(x)$ affect the error, a cosine antenna pattern will be assumed (which is a good approximation of the one-way pattern of a phase monopulse antenna taken along the elevation boresight), and the error will be evaluated, using Equation 23. Thus, let $$f_1(x)=K\cos kx \quad (27)$$

wherein $K$=gain of antenna (a constant) and $k$=a measure of the beam width of the antenna; from which $$f_1'(x)=-K\ k\ \sin\ kx_0 \qquad (28)$$

and Equation 23 becomes $$\overline{\delta^2}=\frac{\sigma^2}{f_r K^2 k}\frac{\int_{-x_0}^{x_0} h^2(x)dx}{\left[\int_{-x_0}^{x_0} kh(x)f_1'(x)dx\right]^2} \qquad (29)$$

Substituting R for the bracket in Equation 29, there results $$\overline{\delta^2}=\frac{\sigma^2}{f_r K^2 k}R \qquad (30)$$

The value R was found for several different weighting functions and the results are presneted in FIGURE 4. Although $h(x)$ is varied drastically, the function R (which is proportional to the error) undergoes relatively little change. As an example, the "step"

$$h(x)=\begin{bmatrix} 1;\ x<0 \\ -1;\ x>0 \end{bmatrix} \qquad (31)$$

yields a value of $R=0.785$ for the $kx_0=\pi/2$ while the optimum $h(x)$ yields $R=0.637$, corresponding to an improvement of less than 1 db over the "step."

From the foregoing it will be observed that the null-type indicating correlator of FIGURE 2 yields a minimum mean square error for a restrictive set of functions $h(x)$ which results in a $\phi(\tau)$ that traverses zero when the correlation between the replica and the stored function is a maximum. This is contrasted with the correlator of FIGURE 1 in which the indication of maximum correlation requires determination of the time at which the output of the correlator reaches a maximum value.

In FIGURE 5 there is shown in schematic form one embodiment of the null correlator shown in FIGURE 2. As shown in FIGURE 5, an input signal is applied to a delay line 11' which may be considered as a lumped constant video delay line. A plurality of taps at appropriate points are connected to the delay line 11'. In series with these taps are a plurality of potentiometers 27, 29, 31, 33, 35, 37 and 39. Connected in series with the movable contact arm of potentiometers 27 through 39 are a plurality of resistors 41 through 53, respectively. The other ends of resistors 41, 43, 45 and 47 are connected in common and coupled to an amplifier 55 of the type that reverses polarity. In a similar manner, the other ends of resistors 49, 51 and 53 are connected in common by a conductor 57. The output of amplifier 55 is connected through a resistor 59, the other end of which is coupled to a summing amplifier 61. Conductor 57 is connected to a junction between resistor 59 and summing amplifier 61. The output of summing amplifier 61 is connected to a null indicator 63 from which an output signal is obtained.

The point at which the movable contact arms of the potentiometers are located is indicative of the amount of weight being applied to each tap. Thus, the weighting of each tap can be changed by moving the setting of the contact arm.

As the wavefore to be correlated is applied to delay line 11', voltages will be developed between the point of contact of the movable arms of each potentiometer and ground. The voltages developed in potentiometers 27 to 39, are fed through series resistors 41 to 53, respectively. Resistors 41 to 53 are utilized for the purpose of providing a high series impedance to obtain current addition of the various taps.

In the embodiment shown in FIGURE 5, the first four taps including potentiometers 27 to 33 are indicative of negative weighting factors, whereas, taps including potentiometers 35 to 39 are indicative of positive weighting factors. This is by way of illustration only. The currents in the first four taps are added in summing amplifier 55 (which may be an operational or D.C. amplifier).

This summed output of reverse polarity amplifier 55 is fed through resistor 59 to a second summing amplifier 61 to which is fed the currents developed in the remaining three taps. At maximum correlation, the output signal from summing amplifier 61 crosses zero (or is zero output). Thus, the output signal from amplifier 61 may be used to drive a servo mechanism for positioning a map matcher or it may be fed to a null indicator 63. Use of the null indicator, enables one to determine the time at which maximum correlation occurs.

Null indicator 63 serves the purpose of indicating when the function being processed is close to maximum correlation. Thus, indicator 63 may take the form of a gating circuit which permits a pulse to be generated at maximum correlation for stopping a counter, for performing a read out, etc.

Because of the relative simplicity associated with the "step" weighting function, its use will be considered in connection with FIGURE 6. The embodiment shown schematically in FIGURE 6 illustrates the simplicity of concept. In FIGURE 6, there is shown a beam splitter including a delay line 11' to which is coupled a plurality of taps. Connected to each tap is a fixed resistance. The other ends of the resistors are connected together in two sets and the outputs of each set are fed to a subtractor 65. The output from the subtractor is coupled to a null indicator 63'.

The beam splitter illustrated in FIGURE 6 may be utilized in situations in which the waveform (function) being correlated has a particular type of symmetry, such as the main lobe of an antenna pattern. Here, the interest is not in obtaining an optimum but a good indication of where the center occurs and at which time it occurred. As in the null correlator described hereinbefore, there are a plurality of taps, but in the beam splitter, all the weighting factors are unity. In series with each tap is a fixed resistor 67. Because of the symmetry of the waveform under investigation (cosine pattern) there will appear an equal number of negative and positive weighting factors. The optimum weighting factors are given by values of the derivative of the cosine functions; in the beam splitter all that is required is the polarity of these values.

The outputs of the two sets of taps are fed to a conventional subtractor 65 and maximum correlation occurs when there is a zero output from the subtractor.

In FIGURE 7, is illustrated an embodiment of a correlator which ignores ambiguity and which is useful in waveform recognition or image recognition systems wherein a continuous waveform occurs. In the embodiment illustrated in FIGURE 7, there are combined the conventional correlator of FIGURE 1 in parallel with the null indicating correlator of FIGURE 2 or 5, utilizing a common delay line 11 and common taps.

In operation, the output of the conventional correlator is fed to a correlation threshold device 69, a device which is set to a predetermined voltage level corresponding to a predetermined value of correlation. When the voltage at the input of threshold device 69 exceeds the voltage level, a gate 71 opens, enabling passage of the current from the null correlator to pass through the gate to the null indicator 73.

While particular embodiments of the invention have been shown and described herein, it is not intended that the invention be limited to such disclosure, but that changes and modifications can be made and incorporated within the scope of the claims.

What is claimed is:

1. A correlation system for comparing a stored function with a replica of the stored function comprising delay line means having a plurality of weighted taps, means for storing the function in said plurality of taps, means for applying the replica of the stored function to said delay line, and summing means for summing the weighted outputs of said taps for obtaining a voltage signal indicating the time of maximum correlation between the stored function and the replica of the stored function in such a manner that said weighted outputs are algebraically summed to produce said voltage signal which traverses zero at said maximum correlation.

2. A correlation system for comparing a stored function with a replica of the stored function comprising delay line means having a plurality of weighted taps on which are stored the derivative of the stored function, means for applying the replica of the stored function to said delay line means, and summing means for summing the weighted outputs of said taps for obtaining a voltage signal indicating the time of maximum correlation between the stored function and the replica of the stored function in such a manner that said weighted outputs are algebraically summed to produce said voltage signal which traverses zero at said maximum correlation.

3. A correlation system for comparing a stored function with a replica of the stored function comprising delay line means having a plurality of weighted taps, means for storing the derivative of the stored function in said taps, means for applying the replica of the stored function to said delay line, and summing means for summing the weighted outputs of said taps for obtaining a voltage signal indicating the time of maximum correlation between the stored function and the replica of the stored function in such a manner that said weighted outputs are algebraically summed to produce said voltage signal which traverses zero at said maximum correlation.

4. A correlation system for comparing a stored function with a replica of the stored function comprising a delay line having at least two weighted taps, means for storing the derivative of the stored function in said taps, means for applying the replica of the stored function to said delay line, and summing means for summing the weighted outputs of said taps for obtaining a voltage signal indicating the time of maximum correlation between the stored function and the replica of the stored function in such a manner that said weighted outputs are algebraically summed to produce said voltage signal which traverses zero at said maximum correlation.

5. A correlation system for comparing a stored function with a replica of the stored function comprising a delay line having a plurality of unity weighted taps, means for applying the replica of the stored function to said delay line, and summing means for summing the weighted outputs of said weighted taps for obtaining a voltage signal indicating the time of maximum correlation between the stored function and the replica of the stored function in such a manner that said weighted outputs are algebraically summed to produce said voltage signal which traverses zero at said maximum correlation.

6. A correlation device for comparing a stored function with a degraded replica of the stored function comprising a delay line means to which is applied to degraded replica of the stored function, a plurality of taps coupled to said delay line means, said taps weighted with the derivative of the stored function, and summing means for summing the weighted outputs of said weighted taps algebraically for obtaining a zero output signal when correlation of the stored function of the degraded replica is maximum.

7. A correlation device comparing a known waveform with a noise degraded replica of the known waveform comprising a lumped constant delay line, a plurality of taps coupled to said delay line, means for weighting said plurality of taps with the derivative of the known function, means for applying the noise degraded replica to said delay line, and summing means for summing the weighted outputs of said plurality of weighted taps algebraically for obtaining a zero output signal when correlation of the known waveform with the noise degraded replica is a maximum.

References Cited by the Examiner

UNITED STATES PATENTS

| | | | |
|---|---|---|---|
| 2,166,991 | 7/1939 | Guanella. | |
| 2,448,718 | 9/1948 | Koulicovitch | 328—150 |
| 2,840,308 | 6/1958 | van Horne | 235—181 |
| 2,977,543 | 3/1961 | Lutz et al. | 333—29 |
| 2,982,852 | 5/1961 | Fano | 333—29 |
| 3,069,507 | 12/1962 | David. | |

OTHER REFERENCES

Westcott: "The Continuous Delay-Line Synthesizer as a System Analogue," The Institution of Electrical Engineers Monograph No. 176 M, May 1956.

MALCOLM A. MORRISON, *Primary Examiner.*

F. W. STRADER, *Examiner.*

I. KESCHNER, K. CLAFFY, T. D. JENNINGS, *Assistant Examiners.*